Aug. 23, 1927.
A. OLSEN, JR
1,640,052
CANDY PACKAGE
Filed Dec. 21, 1925
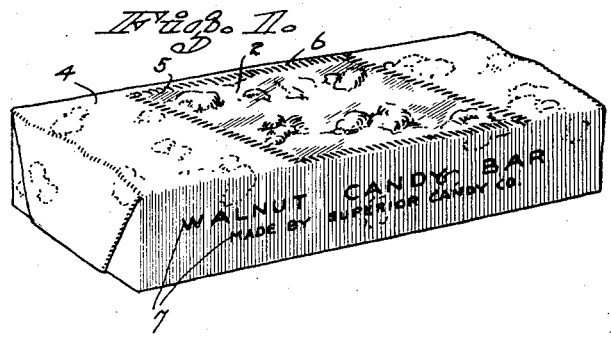
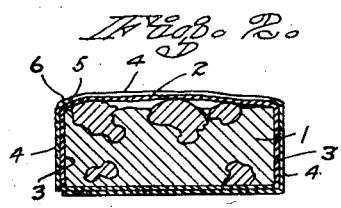
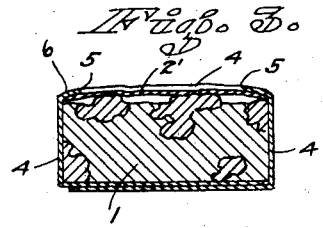
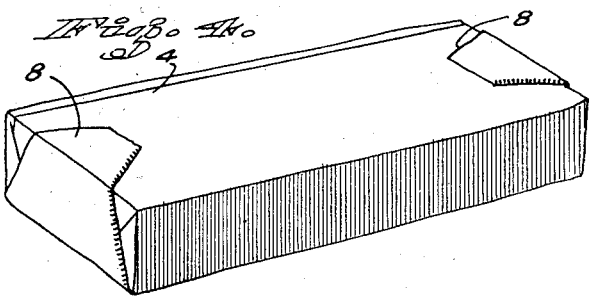
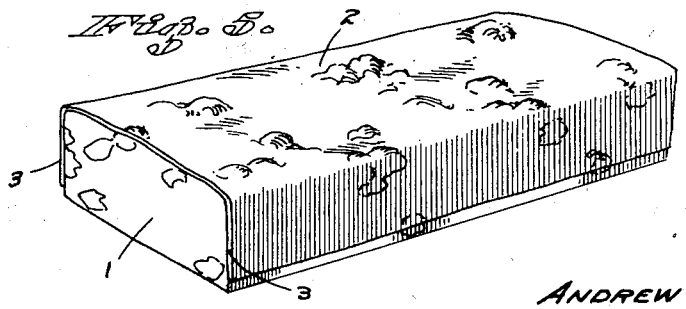
Inventor
ANDREW OLSEN, JR.,
By Miller & Boyken,
Attorneys Patented Aug. 23, 1927.

1,640,052

UNITED STATES PATENT OFFICE.

ANDREW OLSEN, JR., OF SAN FRANCISCO, CALIFORNIA.

CANDY PACKAGE.

Application filed December 21, 1925. Serial No. 76,704.

This invention relates to candy packages and refers particularly to the sanitary packing of bar candies.

The objects of the invention are to provide an improved package for such candies so that the goods will be effectually sealed against contamination, clearly visible through the central portion of the package and preferably partially visible through the remaining portion, a package which will require the minimum of costly wrapping material, and one which is not likely to become disarranged.

In the drawings hereto my improvements are shown—Figure 1 being a perspective representation of a complete package, Figure 2 a central cross section, Figure 3 a modified cross section, Figure 4 the bottom of the package, and Figure 5 the candy bar in its first stage of wrapping.

Briefly described, my invention comprises a candy bar wrapped in a certain way with a combination of waxed paper and perfectly transparent pellicle, preferably of cellulose.

The latter material is perfectly transparent, so much so in fact as to appear practically non-existent when used to cover a candy bar.

However, such pellicles, of which there are several varieties, are too expensive to use as an entire packing for the cheaper candies, and are not suitable to print upon, and also have a tendency to stick too tightly to the semi-soft candy bars if they underlie the candy and are continually subject to its weight.

To derive the great advantages of this material as a sanitary covering for candy and the gain in sales through the visibility of the candy therethrough, yet overcome its drawbacks above mentioned, I use a comparatively small piece of the material and reinforce the same as it were with waxed or other translucent paper—all in a manner so that the entire upper surface of the candy bar is substantially visible, perfectly so in the central region and partially so in the remaining portions.

To achieve the above result, I first cover the face of the candy bar 1 with a sheet of the pellicle 2, bringing the same down over the two long edges as at 3 and to which it will slightly adhere if pressed thereagainst, especially if the candy is very fresh.

The candy as above is next surrounded with a waxed paper wrapper 4 having a cut-out portion 5 which preferably overlaps the long edges of the bar as shown at 6 and may or may not have a border printed therearound as indicated, while at any desired place the waxed wrapper may be further printed with the name of the candy and maker as indicated at 7.

The waxed wrapper is of one thickness only on top of the candy so as to maintain maximum transparency and is overlapped on the bottom of the bar as indicated in Figures 2 and 3, the ends 8 being folded and bent under the package as shown in Figure 4, the weight of the bar sufficing to hold them in place, tho they may be gummed in place, also if desired.

By the wrapping described it will be seen that the bar is covered everywhere with a double layer of material at all points especially well inward from both ends where it is handled or comes in contact with extraneous objects in stores, while the portion within the cut-out 5 which is never handled is covered with but a single layer of transparent pellicle.

A slight modification in the above is shown in Figure 3 wherein the pellicle 2' is cut to substantially the size of the upper face of the candy bar and is held in place by the outer wrapping 4.

While I prefer the combination of transparent pellicle and translucent waxed paper as shown in Figure 1 so as to make an especially attractive sales package, it is evident that some of the advantages of my invention might be gained even with a common paper outer wrapper applied in the manner described.

I claim:

1. A package of the character described comprising a bar of confection, a transparent pellicle in contact with and covering the face of the same, and a translucent waxed paper wrapper folded and sealed over the confection enclosing the same and provided with a cut-out over said pellicle.

2. A package of the character described comprising a bar of candy, a transparent pellicle in contact with and covering the entire face and edges only of the bar, and a waxed paper wrapper folded and sealed over the bar enclosing the same and provided with a cut-out over said pellicle within the marginal outline of the bar.

3. A candy package for a bar of candy in which the face of the bar is covered with a wrapping perfectly transparent over a portion of its face surface only and translucent over the remaining portion and being sealed thereover.

ANDREW OLSEN, Jr.